June 18, 1929.  A. W. FREHSE  1,717,675
BRAKE LEVER
Filed Oct. 24, 1927
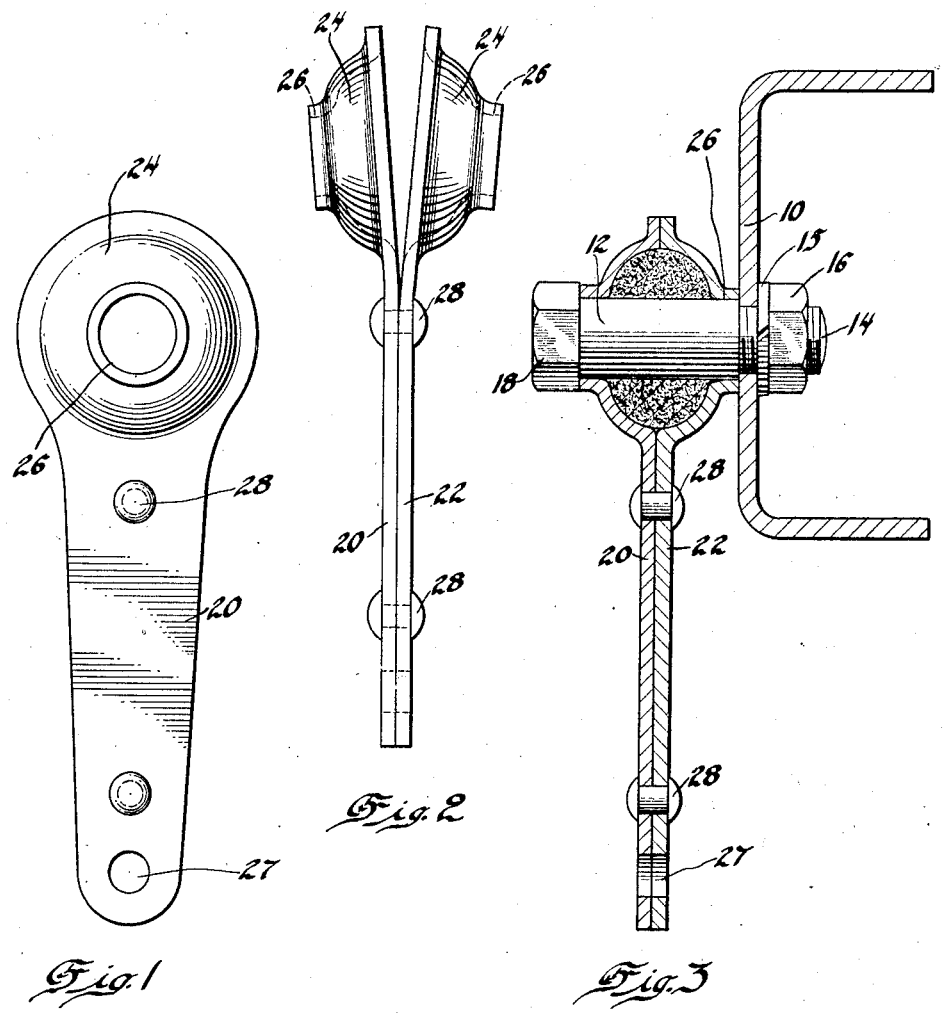

Patented June 18, 1929.

1,717,675

UNITED STATES PATENT OFFICE.

ALBERT W. FREHSE, OF DETROIT, MICHIGAN, ASSIGNOR TO GENERAL MOTORS CORPORATION, OF DETROIT, MICHIGAN, A CORPORATION OF DELAWARE.

BRAKE LEVER.

Application filed October 24, 1927. Serial No. 228,275.

This invention relates to an idle lever and its mounting.

While my invention is capable of use in connection with a wide variety of pivoted levers, I have illustrated it in connection with an idle brake lever pivoted to the side of the chassis frame for supporting the brake operating rod. It is an object of the invention to provide a new and improved idle lever which is capable of being more cheaply manufactured than those now in use. It is a further object of the invention to provide an idle lever of this type which is so constructed that when it is mounted in operating position it is able to carry a supply of lubricant sufficient to last indefinitely but in which the supply of lubricant can be easily replenished when desired.

Other objects and advantages of the invention will appear in the course of the following description, taken in connection with the accompanying drawing and appended claims.

In the drawing:

Figure 1 is a side view of my improved brake lever.

Figure 2 is an end view of the brake lever.

Figure 3 is a transverse vertical section through the brake lever and frame member showing the brake lever mounted in position on the car.

Referring to the drawing, I have illustrated in Figure 3 a section of the usual channel-shaped longitudinal frame member 10 on the outer side of which is mounted a stub shaft 12. Shaft 12 is provided with a reduced threaded end 14 extending through a bolt hole in the frame member 10 and adapted to receive lock-washer 15 and nut 16. The outer end of stub shaft 12 is formed with the usual enlarged head 18.

Mounted on the stub shaft 12 is the brake lever. This lever comprises two complementary sections, 20 and 22, which are, in the present case but not necessarily, exact duplicates. Each section is stamped from a single strip of metal capable of springing slightly and is shaped to provide a bearing surface 26 for the stub shaft.

In assembling the lever, the two sections 20 and 22 are fastened together by means of two rivets 28, with the heads 24 slightly sprung apart, as shown in Figure 2. The usual aperture 27 is provided in the lower end of the lever for connection with the brake operating rod. With the parts in this position, packing material is inserted in the head and the bolt 12 inserted through the bearing aperture 26. The packing is then saturated with lubricant, the reduced end 14 inserted through the bolt hole in the frame member 10 and nut 16 tightened over washer 15. As nut 16 is tightened, the hemispherical heads 24 are drawn tightly together. The lubricant is thus held by the packing and can pass out only between the bearing surfaces 26 and the surface of stub shaft 12. In case it is desired to add more lubricant, it is necessary only to loosen nut 16 slightly, put in the lubricant, and tighten the nut again.

I claim:

1. In combination, a supporting shaft and a lever mounted thereon, said lever comprising two complementary sections rigidly fixed together, said sections being formed with diverging portions adjacent one end providing an enclosed space, and provided with bearing openings for said shaft in said diverging portions.

2. In combination, a supporting shaft and a lever mounted thereon, said lever comprising two complementary sections rigidly fixed together, said sections being shaped adjacent one end with diverging portions shaped to provide an enclosed space for containing lubricant, said sections being made of metal under a springing tension, said diverging portions being provided with bearing surfaces for receiving said shaft, and means for clamping said diverging portions tightly together.

3. In combination, a supporting frame member and a shaft supported thereon, a lever supported on said shaft comprising two complementary sections rigidly fixed together, said sections being shaped adjacent one end with diverging portions shaped to provide an enclosed space for containing lubricant, said sections being made of metal under springing tension, said diverging portions being provided with bearing openings for receiving said shaft, and means for fixing said shaft to said frame member and operable to simultaneously clamp said diverging portions together.

In testimony whereof I affix my signature.

ALBERT W. FREHSE.